United States Patent [19]

Baczkowski

[11] Patent Number: 5,344,002
[45] Date of Patent: Sep. 6, 1994

[54] COMBINATION EYEGLASS LENS POLISHER AND EYEGLASS HOLDER DEVICE

[76] Inventor: Mark Baczkowski, 2020 Broom Firth Ct., Westlake Village, Calif. 91361

[21] Appl. No.: 23,456

[22] Filed: Feb. 26, 1993

[51] Int. Cl.⁵ .................................. A45C 11/04
[52] U.S. Cl. .............................. 206/5; 15/214
[58] Field of Search ............ 206/5 R; D3/34; 15/214

[56] References Cited

U.S. PATENT DOCUMENTS

| | | |
|---|---|---|
| 361,724 | 4/1987 | Shailer . |
| 399,450 | 3/1989 | Thorpe . |
| 1,025,372 | 5/1912 | Conrad ........................ 15/219 X |
| 2,262,142 | 11/1941 | Karmsen ....................... 206/5 R |
| 2,554,630 | 5/1951 | Miller . |
| 2,739,698 | 8/1952 | Baratelli . |
| 2,762,500 | 9/1956 | Parsell . |
| 2,903,125 | 9/1959 | Levoy . |
| 2,918,959 | 5/1957 | Bloch . |
| 3,369,651 | 2/1968 | Crowley . |
| 3,381,806 | 5/1968 | McDonagh . |
| 4,269,306 | 5/1981 | Feniger . |
| 4,287,985 | 9/1981 | Feniger ........................ 206/5 R |
| 4,863,013 | 9/1989 | Eastman . |
| 5,000,204 | 3/1991 | Smith . |
| 5,014,846 | 5/1991 | Walker et al. . |
| 5,032,019 | 7/1991 | Burchett . |

FOREIGN PATENT DOCUMENTS

| | | |
|---|---|---|
| 1295772 | 7/1963 | Fed. Rep. of Germany . |
| 984095 | 2/1951 | France ........................ 15/214 |

*Primary Examiner*—Bryon P. Gehman
*Attorney, Agent, or Firm*—John J. Posta, Jr.

[57] ABSTRACT

The improved combination eyeglass lens polisher and eyeglass holder device includes an elongated, flexible, resilient bottom strip having opposite ends and a bottom surface and opposite upper surface. The bottom surface and, preferably, the entire bottom strip, is non-abrasive to eyeglass lenses and is adapted for polishing such lenses. A pair of flexible, resilient eyeglass holder pockets are secured, as by stitching, to the upper surface of the bottom strip adjacent its opposite ends and are spaced apart to define a central foldable portion therebetween. The pockets hold a pair of eyeglasses, with one lens thereof in each pocket. When it is desired to polish the lenses, the eyeglasses are removed from the pockets, the thumb of one hand is inserted in one pocket and the forefinger and middle finger of the same hand are inserted in the other pocket, and then the opposite ends of the bottom strip are bent toward each other, using the fingers in the pockets to effect the same, the device folding around the central foldable portion, so that an eyeglass lens is embraced on both sides simultaneously by the bottom surface of the bottom strip. Polishing thereof is carried out by kneading, using the pocketed fingers. The bottom strip can be of chamois, cotton or the like, and the device can contain an openable closure such as a drawstring across the mouths of the pockets, with or without a pull tab and releasable slide lock.

14 Claims, 1 Drawing Sheet

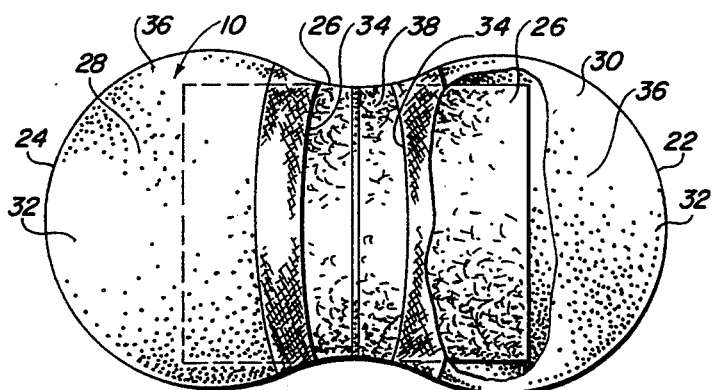
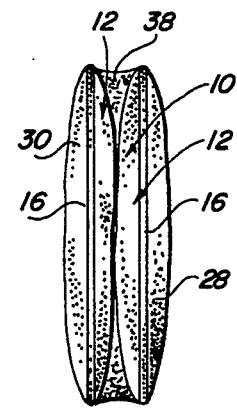
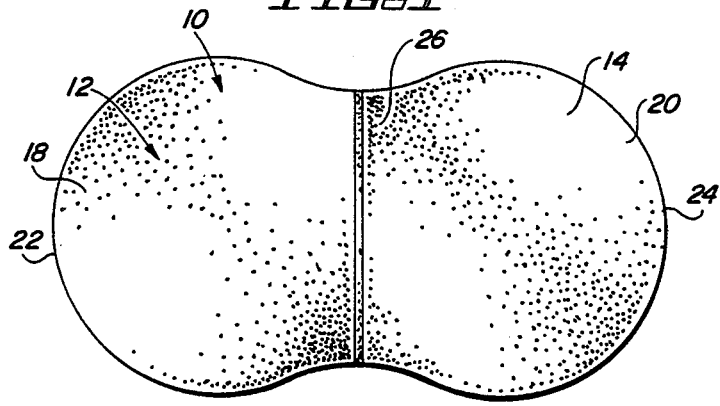
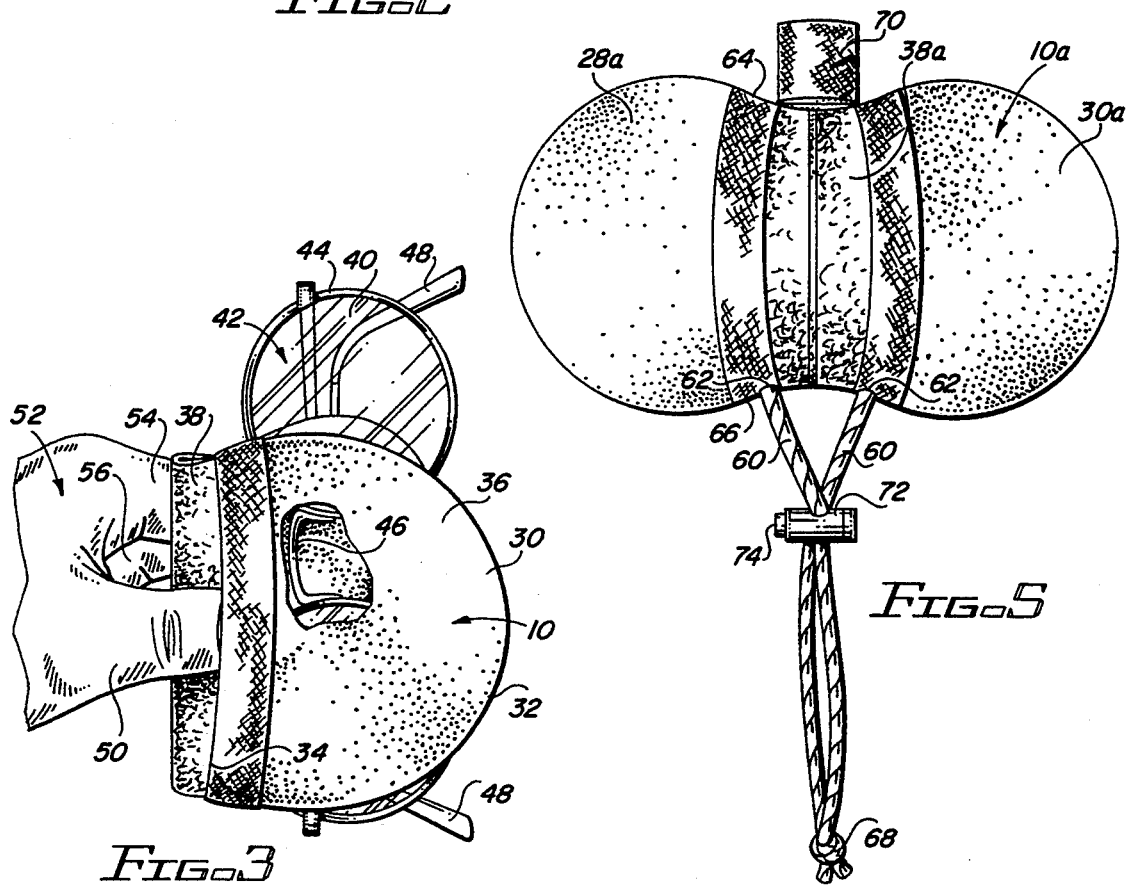

COMBINATION EYEGLASS LENS POLISHER AND EYEGLASS HOLDER DEVICE

BACKGROUND OF THE INVENTION

1. Field of the Invention

The present invention generally relates to viewing aids and more particularly to an improved combination device suitable for holding a pair of eyeglasses and for polishing the same.

2. Prior Art

Eyeglasses have in the past been considered to be relatively fragile and have been generally provided with hard protective cases. However, modernly, while the lenses of eyeglasses still need protection against scratching, even though in some cases they are specially coated or hardened, the frames of the eyeglasses are usually made of relatively thick plastic or of durable metal. Therefore, the use of bulky inflexible eyeglass cases is on the decline.

Eyeglass lenses readily become dirty from dust, grime, grit, fingerprints and the like and, when dirty, are difficult to see through. Seeing through dirty glasses may even impair vision to a noticeable degree. Yet the lens tissues and the like which are suitable for use in polishing dirty eyeglass lenses are a nuisance to carry about and therefore are not normally used. Instead, water and a handkerchief or the like is normally used. But modern handkerchiefs are made of wash and wear, easy to iron synthetic fibers which may easily scratch and abrade an eyeglass lens.

Therefore, there remains a need for an improved device which protects eyeglasses from accumulation of dirt and grime and from scratching and abrading while providing convenient means for readily and rapidly polishing eyeglass lenses, as needed. Such device should be simple, easy to carry and to use and relatively inexpensive, yet durable. It should also be capable of being made in a variety of sizes, shapes, colors and patterns so as to be attractive and appealing.

SUMMARY OF THE INVENTION

The improved combination eyeglass holder and lens polisher device of the present invention satisfies all the foregoing needs. The device is substantially as set forth in the Abstract of the Disclosure.

Thus, the device includes a bottom strip of flexible, resilient material having opposite ends and a bottom surface and opposite upper surface. At least the bottom surface and, preferably, the entire strip is fabricated of non-abrasive cloth or the like, such as chamois, or cotton, which is particularly adapted for polishing an eyeglass lens rapidly and effectively without scratching or wearing its surfaces.

The device also includes a pair of spaced pockets at opposite ends of the device and attached to the upper surface of the bottom strip, with the open mouths of the pockets facing each other. The pockets are flexible, resilient and non-abrasive to eyeglass lenses. They can be fabricated of cotton or the like soft cloth. They releasably hold the two lenses of the eyeglasses while the nose bridge and ear holders of the eyeglasses span the readily foldable central portion of the device on the upper surface of the bottom strip between the pockets. A separate strip of flexible, resilient, durable cloth can be stitched to the upper surface of that central portion. The mouths of the pockets can be pulled tight around the eyeglass lenses by a suitable closure such as pairs of velcro-type strips or one or a pair of drawstrings. Each such drawstring can be provided with a pull tab and/or releasable slide lock to hold the drawstring in the desired position.

When it is desired to use the device to polish the lenses of the eyeglasses, the eyeglasses are removed from the pockets. Then a thumb of one hand is inserted into one pocket and the forefinger and middle finger of the same hand are inserted into the other pocket, after which the pockets are bent around the central portion of the device so that the two opposite end portions of the bottom surface of the bottom strip embrace the opposite sides of one of the eyeglass lenses. Those two end portions are then rubbed back and forth against the adjacent surfaces of that lens by means of the fingers in the pockets, until the lens is clean, after which the same procedure is repeated for the other eyeglass lens.

Thus, the present device carries with it as an integral component thereof the desired lens polishing means, while simultaneously providing a protective portable container for the eyeglasses, which container is easy to fit into the pocket of a suitcoat, sweater or pants or into a purse, handbag or the like.

Further features of the present invention are set forth in the following detailed description and accompanying drawings.

DRAWINGS

FIG. 1 is a schematic top plan view, partly broken away, of a first preferred embodiment of the improved combination eyeglass lens polisher and eyeglass holder device of the present invention;

FIG. 2 is a schematic bottom plan view of the device of FIG. 1;

FIG. 3 is a schematic side elevation of the device of FIG. 1, showing the device folded around an eyeglass lens for polishing thereof, and held in place by the thumb, forefinger and middle finger of one hand;

FIG. 4 is a schematic front elevation of the device of FIG. 3, shown in the folded condition but with the eyeglass lens removed therefrom; and, FIG. 5 is a schematic top plan view of a second preferred embodiment of the improved device of the present invention, shown with drawstring, pull tab and drawstring lock.

DETAILED DESCRIPTION

FIGS. 1–4

Now referring more particularly to FIGS. 1–4 of the drawings, a first preferred embodiment of the improved embodiment of the improved combination lens polisher and eyeglass holder device of the present invention is schematically set forth therein.

Thus, device 10 is shown, which comprises the following combination:

a) Device 10 includes an elongated bottom strip or sheet 12 of flexible, resilient material having a bottom surface 14 and an opposite upper surface 16, and opposite ends 18 and 20. At least bottom surface 14 and preferably all of strip 12 is of a material, such as chamois or cotton, which not only does not scratch or abrade eyeglass lenses, but which is ideally suited for polishing such lenses. Preferably, strip 12 and the whole of device 10 in plan view is kidney shaped, having a pair 22 and 24 of spaced lobes and a narrowed central portion 26.

b) Device 10 also includes a pair of curved, flexible, resilient pockets 28 and 30 secured to upper surface 16, as by stitching or the like, at opposite ends 18 and 20, so as to define therebetween and expose for view central portion 26 referred to above. Pockets 28 and 30 have closed ends 32 facing away from each other and open mouths 34 facing each other. Pockets 28 and 30 are formed of soft material, such as cotton or a cotton and synthetic fiber mixture, which does not scratch lenses. Pockets 28 and 30 could also be formed of soft synthetic plastic film or a natural material such as suede or the like. Other materials are possible. The upper surfaces 36 of pockets 28 and 30 can, if desired, be printed in color, embossed or otherwise decorated to increase the eye appeal of device 10.

c) A generally rectangular flat strip 38 is stitched or otherwise secured to the upper surface 16 of bottom strip 12 in central portion 26 and extends into mouths 34. Strip 38 is of durable material such as sturdy cotton, which is easily bent and folded and which resists breaking during repeated folding. It is a reinforcement for device 10, and can be eliminated, if desired.

As previously described, the lens portions 40 of a pair of eyeglasses 42 can be releasably disposed in pockets 28 and 30, with frame 44 of eyeglasses therearound and with nose bridge 46 and ear pieces 48 thereof bridging central portion 26. Thus, pockets 28 and 30 protect lenses 40. Yet device 10 is made of soft lightweight material easily inserted into and removed from a pocket of an item of clothing, or a purse or handbag or the like.

When it is desired to polish lenses 40, eyeglasses 42 are withdrawn from pockets 28 and 30. Then, as previously described, the thumb 50 of one hand 52 is inserted into one of pockets 28 and 30 and the forefinger 54 and middle finger 56 of the same hand are inserted into the other of the two pockets, after which device 10 is bent so as to cause the opposite ends 18 and 20 of bottom surface 14 to pinch a lens 40 therebetween, as shown in FIG. 4. Surface 14 is then rubbed back and forth against opposite sides of lens 40, rapidly and thoroughly cleaning it, the thumb 50 and fingers 54 and 56 in the pockets causing the rubbing action. The same procedure is then carried out on the other of the two lenses.

Accordingly, device 10 is simple, durable, inexpensive and efficient to both house and carry eyeglasses 42 and to polish lenses 40 thereof with maximum speed.

FIG. 5

Now referring more particularly to FIG. 5 of the accompanying drawings, a second preferred embodiment of the improved device of the present invention is schematically depicted therein. Thus, device 10a is shown. Components thereof similar to those of FIGS. 1–4, bear the same numerals but are succeeded by the letter "a".

Device 10a is substantially identical to device 10, except as follows:

a) device 10a has closure means for pockets 28a and 30a in the form of a drawstring 60 which runs through a pair of tubular cloth channels 62 connected to the upper surfaces of mouths 34a. Drawstring 60 bridges central portion 26a on one side 64 of device 10a and extends laterally from opposite side 66 of device 10a, ending in a knot 68.

b) device 10a has a pull tab 70 connected to drawstring 60 on side 64 and a slide lock 72 on the portion of drawstring 60 extending laterally of side 66.

Slide lock 72 has a spring loaded release pin 74 which releasably cinches lock 72 to drawstring to hold drawstring 60 releasably in the desired position.

Device 10a has the other advantages of device 10.

Various other modifications, changes, alterations and additions can be made in the improved device of the present invention, its components and their parameters. All such modifications, changes, alterations and additions as are within the scope of the appended claims form part of the present invention.

What is claimed is:

1. An improved combination eyeglass lens polisher and eyeglass holder device, said device comprising, in combination:

a) a generally flat, flexible, resilient, elongated bottom strip having opposite ends and a bottom surface and opposite upper surface, said bottom surface being non-abrasive to eyeglass lenses and adapted for polishing eyeglass lenses;

b) a pair of flexible, resilient eyeglass holder pockets secured in spaced relation from each other on said upper surface of said bottom strip adjacent said opposite ends to define therebetween a central, readily foldable portion of said device, whereby said opposite ends of said bottom strip can be folded towards each other around said central portion so as to releasable embrace and polish opposite sides of an eyeglass lens; and c) wherein said central portion is a separate, flexible, resilient strip secured to said upper surface of said bottom strip.

2. The improved device of claim 1 wherein said bottom strip comprises chamois.

3. The improved device of claim 2 wherein said pockets comprise non-abrasive cloth.

4. The improved device of claim 3 wherein said device includes a releasable closure for said pockets.

5. The improved device of claim 4 wherein said closure comprises a drawstring disposed laterally across the mouths of said pockets.

6. The improved device of claim 5 wherein said closure includes a pull tab connected to said drawstring at one side of said drawstring device and wherein said drawstring extends laterally outwardly from the opposite side of said device.

7. The improved device of claim 6 wherein said drawstring includes a releasable slide lock.

8. The improved device of claim 1 wherein said central portion comprises cotton.

9. The improved device of claim 8 wherein said opposite ends of said device are rounded for easy insertion of said device into a clothing pocket.

10. The method of cleaning eyeglasses with an eyeglass holder, comprising:

a) providing a holder having a pair of opposed lens holder pockets therein, and having an outside surface thereof made of non-abrasive material for polishing eyeglass lens, b) inserting a pair of eyeglasses having lenses into said pockets, c) removing said eyeglasses from said pockets when ready for use, d) folding said pockets over one another and disposing one of said lenses between said pockets, such that said material contacts each side of said lens, and e) cleaning said lens by rubbing said material over said lens.

11. The improved method of claim 10 wherein said pockets comprise non-abrasive material.

12. The improved method of claim 11 wherein said holder includes a releasable closure for said pockets.

13. The improved method of claim 12 wherein said holder comprises a drawstring.

14. The improved method of claim 13 wherein said drawstring includes a releasable slide lock.

* * * * *